(12) United States Patent
Ni et al.

(10) Patent No.: US 7,944,703 B2
(45) Date of Patent: May 17, 2011

(54) FLASH MEMORY DEVICE ASSEMBLY USING ADHESIVE

(75) Inventors: Jim Chin-Nan Ni, San Jose, CA (US); Nan Nan, San Jose, CA (US); I-Kang Yu, Palo Alto, CA (US); Abraham C. Ma, Fremont, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 597 days.

(21) Appl. No.: 12/062,464

(22) Filed: Apr. 3, 2008

(65) Prior Publication Data
US 2008/0212297 A1  Sep. 4, 2008

Related U.S. Application Data

(60) Continuation-in-part of application No. 11/872,685, filed on Oct. 15, 2007, now abandoned, which is a division of application No. 10/990,887, filed on Nov. 16, 2004, now Pat. No. 7,301,776, said application No. 12/062,464 is a continuation-in-part of application No. 11/382,467, filed on May 9, 2006, now Pat. No. 7,365,985, which is a continuation-in-part of application No. 10/956,893, filed on Sep. 29, 2004, now Pat. No. 7,215,551, said application No. 12/062,464 is a continuation-in-part of application No. 11/683,292, filed on Mar. 7, 2007, now Pat. No. 7,576,990, and a continuation-in-part of application No. 11/309,843, filed on Oct. 11, 2006, now Pat. No. 7,649,742.

(51) Int. Cl.
*H05K 5/00* (2006.01)

(52) U.S. Cl. ........ 361/752; 361/737; 361/600; 361/713; 361/719; 361/728; 174/259

(58) Field of Classification Search .................. 361/752, 361/737, 730, 715, 600, 719, 728, 713, 720, 361/736, 732, 741; 174/50.52, 50.5, 259; 257/726, 727; 29/832, 830, 854
See application file for complete search history.

(56) References Cited

U.S. PATENT DOCUMENTS 4,336,927 A * 6/1982 Goff et al. .................. 269/171.5
(Continued)

FOREIGN PATENT DOCUMENTS
JP       2000251463       9/2000
(Continued)

*Primary Examiner* — Dameon E Levi
*Assistant Examiner* — Hoa C Nguyen
(74) *Attorney, Agent, or Firm* — Bever, Hoffman & Harms, LLP; Patrick T. Bever

(57) ABSTRACT

A flash memory device includes one or two panels that are attached solely by a thermal bond adhesive to either a frame or integrated circuits (e.g., flash memory devices) disposed on a PCBA. The frame is disposed around the PCBA and supports peripheral edges of the panels. The thermal bond adhesive is either heat-activated or heat-cured, and is applied to either the memory devices, the frame or the panels, and then compressed between the panels and flash memory devices/frame using a fixture. The fixture is then passed through an oven to activate/cure the adhesive. An optional insulating layer is disposed between the panels and the ICs. An optional conforming coating layer is formed over the ICs for preventing oxidation of integrated circuit leads or soldering area, covering or protecting extreme temperature exposure either cold or hot, and waterproofing for certain military or industrial applications.

14 Claims, 12 Drawing Sheets

U.S. PATENT DOCUMENTS

| | | | |
|---|---|---|---|
| 4,606,962 A | | 8/1986 | Reylek et al. |
| 4,848,758 A | * | 7/1989 | Mills .............................. 269/16 |
| 5,109,318 A | | 4/1992 | Funari et al. |
| 5,206,792 A | | 4/1993 | Reynolds |
| 5,208,732 A | * | 5/1993 | Baudouin et al. ............. 361/704 |
| 5,313,097 A | | 5/1994 | Haj-Ali-Ahmadi et al. |
| 5,330,360 A | | 7/1994 | Marsh et al. |
| 5,413,490 A | | 5/1995 | Tan et al. |
| 5,475,563 A | | 12/1995 | Donahoe et al. |
| 5,476,387 A | | 12/1995 | Ramey et al. |
| 5,477,426 A | | 12/1995 | Bethurum |
| 5,488,523 A | | 1/1996 | Seaver et al. |
| 5,563,769 A | | 10/1996 | MacGregor |
| 5,661,339 A | | 8/1997 | Clayton |
| 5,719,746 A | * | 2/1998 | Ohbuchi et al. ............... 361/737 |
| 5,731,633 A | | 3/1998 | Clayton |
| 5,751,553 A | | 5/1998 | Clayton |
| 5,768,110 A | | 6/1998 | Frommer et al. |
| 5,793,609 A | | 8/1998 | Donahoe et al. |
| 5,892,660 A | | 4/1999 | Farnworth et al. |
| 6,010,509 A | * | 1/2000 | Delgado et al. ................ 606/88 |
| 6,049,975 A | | 4/2000 | Clayton |
| 6,091,145 A | | 7/2000 | Clayton |
| 6,232,659 B1 | | 5/2001 | Clayton |
| 6,256,878 B1 | | 7/2001 | Keane |
| 6,320,252 B1 | | 11/2001 | Potters et al. |
| 6,353,538 B1 | | 3/2002 | Ali et al. |
| 6,362,965 B2 | | 3/2002 | Bookhardt et al. |
| 6,362,966 B1 | | 3/2002 | Ali et al. |
| 6,377,460 B1 | | 4/2002 | Pohl et al. |
| 6,424,532 B2 | | 7/2002 | Kawamura |
| 6,430,000 B1 | | 8/2002 | Rent |
| 6,449,156 B1 | | 9/2002 | Han et al. |
| 6,493,233 B1 | | 12/2002 | De Lorenzo et al. |
| 6,519,110 B2 | | 2/2003 | Dague et al. |
| 6,661,661 B2 | | 12/2003 | Gaynes et al. |
| 6,781,848 B2 | | 8/2004 | Farnworth et al. |
| 6,890,189 B1 | | 5/2005 | Wu |
| 6,908,339 B2 | | 6/2005 | Tanaka |
| 7,008,240 B1 | | 3/2006 | Wang et al. |
| 7,019,980 B2 | | 3/2006 | Gu |
| 7,023,700 B2 | | 4/2006 | Chiou et al. |
| 7,034,223 B2 | | 4/2006 | Fan et al. |
| 7,079,396 B2 | | 7/2006 | Gates et al. |
| 7,106,595 B2 | | 9/2006 | Foster et al. |
| 7,113,392 B2 | | 9/2006 | Lu et al. |
| 2002/0001180 A1 | | 1/2002 | Kawamura |
| 2002/0079117 A1 | | 6/2002 | Coffin et al. |
| 2002/0097556 A1 | | 7/2002 | Lee |
| 2003/0026076 A1 | | 2/2003 | Wei |
| 2003/0061688 A1 | * | 4/2003 | Rodriguez et al. ............. 24/67.5 |
| 2003/0193788 A1 | | 10/2003 | Farnworth et al. |
| 2005/0164532 A1 | | 7/2005 | Ni et al. |
| 2005/0276021 A1 | | 12/2005 | Gates et al. |
| 2006/0041783 A1 | | 2/2006 | Rabinovitz |
| 2006/0056154 A1 | | 3/2006 | Foster et al. |
| 2006/0228910 A1 | | 10/2006 | Nishizawa et al. |

FOREIGN PATENT DOCUMENTS

| | | |
|---|---|---|
| KR | 336757 B | 5/2002 |
| KR | 2002045747 A | 6/2002 |

* cited by examiner

FLASH MEMORY DEVICE ASSEMBLY USING ADHESIVE

CROSS-REFERENCE TO RELATED APPLICATIONS

This application is a continuation-in-part (CIP) of application for "Light-Weight Flash Hard Drive With Plastic Frame", U.S. Ser. No. 11/872,685, filed Oct. 15, 2007, which is a divisional of "Light-Weight Flash Hard Drive With Plastic Frame", U.S. Ser. No. 10/990,887, filed Nov. 16, 2004, now U.S. Pat. No. 7,301,776.

The present application is also continuation-in-part of co-owned U.S. application Ser. No. 11/382,467, filed May 9, 2006, entitled "Memory Module Assembly Including Heat Sink Attached To Integrated Circuits By Adhesive", which is a continuation-in-part of U.S. application Ser. No. 10/956,893, filed Sep. 29, 2004, entitled "MEMORY MODULE ASSEMBLY INCLUDING HEAT SINK ATTACHED TO INTEGRATED CIRCUITS BY ADHESIVE", now issued as U.S. Pat. No. 7,215,551.

The present application is also a continuation-in-part of co-owned U.S. application Ser. No. 11/683,292, filed on Mar. 7, 2007, entitled "Thin Hard Drive with 2-Piece-Casing and Ground Pin Standoff to Reduce ESD Damage to Stacked PCBA's", and U.S. application Ser. No. 11/309,843, filed Oct. 11, 2006, entitled "Thin Flash-Hard-Drive with Two-Piece Casing".

FIELD OF THE INVENTION

The present invention generally pertains to flash hard drive-like devices and flash memory devices, and more particularly to housing structures for flash hard drive and memory card devices, and to methods for assembling flash hard drives and memory card devices using such housing structures.

BACKGROUND OF THE INVENTION

Integrated Drive Electronics (IDE) hard-disk drive (HDD) devices have been used for mass data storage in computer systems for many years. While the use of IDE HDD devices is still a method of choice in stationary "desk top" computer systems (e.g., "desktop" personal computers (PCs)), IDE HDD devices have been found less desirable in portable computer systems (e.g., laptop computers), which require combination of high durability, high reliability, and low weight. Accordingly, in such portable systems, flash hard drives have been used in place of IDE HDD devices due to their advantage of exhibiting better survivability in rugged environments, higher durability, higher reliability, higher performance, lower power consumption, and lower weight than IDE HDD devices.

Flash hard drives are solid-state IC devices without any moving parts because, unlike IDE HDD devices which access data stored on a spinning disk, all data is stored on flash memory integrated circuits (ICs) that are accessed electronically by one or more "controller" IC devices. The flash memory and controller ICs are typically mounted on the printed circuit board (PCB) of a printed circuit board assembly (PCBA), which typically includes a standardized plug connector for connecting the flash hard drive to a host system. Flash hard drives currently range in size from 4 Mega-byte to 8 Gig-byte, but it is anticipated that their size will increase in the future. Flash hard drives are currently available in TSOP, WSOP, TBGA, and FBGA packages. Flash hard drives currently run on 3.3V, 2.5V or 1.8V supply voltages, depending on the device selected. Flash hard drives typically have operating currents 1 mA,max for stand-by operations and 30 mA,max for operating current. Each flash memory IC "block" (i.e., IC device) of the flash hard drive can typically endure 100K or more Program/Erase cycles. The operating life of flash hard drives can be further extended using technologies such as Wear-Leveling.

Flash hard drives are produced to be a pluggable replacement for existing IDE HDD devices in certain applications (e.g., laptop computers). Thus, flash hard drives are typically produced according to the common form factors for current IDE HDD devices (e.g., 3.5", 2.5", and 1.8"), and data transmissions to and from flash hard drives of each form factor size is consistent with its counterpart IDE HDD devices. For example, both 3.5" flash hard drive and 3.5" IDE HDD devices use a standard 40-pin 0.100" IDE connector and a separate 4-pin power connector. In contrast, 2.5" and 1.8" flash hard drives and IDE HDD devices use a 44-pin 2 mm IDE connector, with pins 41-43 of the connector being used for power connection. For use in host system with 3.5" HDD environment, the 2.5" and 1.8" flash hard drives and IDE HDD devices need an adapter to change the standard 40-pin 0.100" IDE connector and power connector to 44-pin 2 mm IDE connector.

Flash hard drive production typically involves forming a printed circuit board assembly (PCBA), and then housing the PCBA inside of a metal case. The PCBA is produced by mounting selected IC components (i.e., one or more flash memory ICs and one or more controller IC devices) as well as a suitable connector onto a PCB. The PCBA is then typically mounted into a metal case formed by a pair of metal covers that mount over the PCBA such that the connector is exposed at one end. Unlike production of the PCBA, which is typically produced using well-known automated assembly systems, the process of mounting the flash hard drive housing over the PCBA is typically performed manually. This manual process typically involves placing the PCBA onto one of the two metal covers, and then connecting the second metal cover to the first metal cover using screw or other fasteners such that the PCBA is housed inside.

A problem associated with conventional flash hard drives is that the existing metal cases and metal screws are still too heavy for many light-weight computing systems. However, simply removing the metal casing is not an option because this would expose the delicate electronics (i.e., the flash memory ICs) to shock and/or corrosion damage. In addition, the conventional manual assembly process can be tedious and time consuming, which can lead to production delays and associated increased production costs.

What is needed is an assembly structure and method for flash hard drives and other flash memory devices that addresses the above problems associated with conventional flash hard drives. In particular, what is needed is a light-weight flash hard drive for portable applications that is highly durable and easy to assemble.

SUMMARY OF THE INVENTION

The present invention is directed to method for assembling flash hard drives and other flash memory devices that addresses the problems associated with conventional assembly methods by providing metal (or plastic) panels and a frame that form a housing for receiving and containing a printed circuit board assembly (PCBA) such that only a connector of the PCBA is exposed through an opening in the housing. The panels are secured to the frame and/or the PCBA solely by way of a thermal bond adhesive. By forming flash hard drives and other flash memory devices using panels that are reliably secured over the PCBA (or frame) solely by thermal bond adhesive, flash drives/devices are formed in accordance with the present invention that are inexpensive to produce, durable, and in some embodiments capable of satisfying high military and industrial quality standards.

According to specific embodiments (e.g., in which the metal/plastic panels are secured to the frame by way of thermal bond adhesive), an electrically insulating, thermally conducting or conforming coating layer is provided between inside surfaces of the panels and upper surfaces of the IC devices mounted on the PCBA. In one embodiment, the contact layer comprises a thermal transfer or shock absorbing material, thereby facilitating thinner panels and a shorter overall profile. In addition, or in the alternative, the panels are secured to the PCBA (e.g., to the upper surfaces of the integrated circuit (IC) devices of the PCBA) or to other structures of the PCBA by way of a thermal bond adhesive layer.

According to an embodiment of the present invention, the housing includes a frame and one or more separate panels that are mounted onto the frame over the PCBA. In one embodiment, the frame includes side rails that define a shallow recess that supports the outer edges of the panels after the PCBA is inserted therein, and the end rail also defines an end portion of the shallow recess that receives and supports a back end edge of the panel. The shallow recess provides a reliable structure for securing the panels to the frame, thereby resisting damage caused, for example, when the flash memory device is dropped or otherwise subjected to mechanical shock. In other embodiments, one of the panels is integrally formed with the frame (i.e., as a single manufactured metal part or otherwise molded in a permanent manner), or the frame is separated into two parts that are integrally formed with a corresponding panel.

According to another embodiment of the present invention, a method for producing a flash hard drive includes producing the various components, sliding or otherwise mounting the PCBA into the frame, and then securing the top and bottom panels to cover and protect the PCBA. The top and bottom panels are secured using a heat-activated or heat-cured adhesive that is provided between inner surfaces of the panels and the upper surfaces of the IC devices, and the assembly is mounted in a fixture that presses the panels against the plastic frame and PCBA. The fixture is then inserted into an oven to activate/cure the adhesive, and then allowed to cool before removal from the fixture.

According to various other aspects of the invention, the PCBA complies with one of a Serial Advanced Technology Attachment (SATA), micro SATA, Secure Digital (SD), micro SD, Integrated Drive Electronics (IDE), PCI Express, Universal Serial Bus (USB), Memory Stick, and Zero Insertion Force (ZIF) specification.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 1:
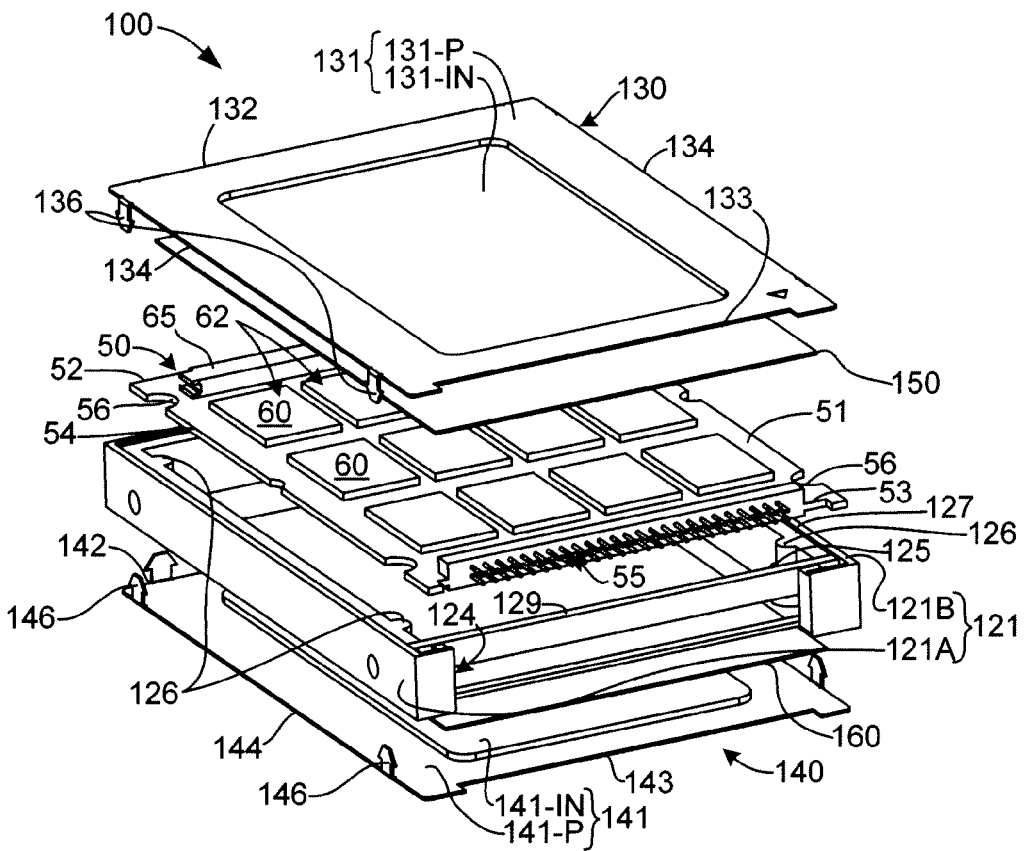
FIG. 1 is an exploded perspective view showing a flash hard drive according to an embodiment of the present invention.
Figure 2:
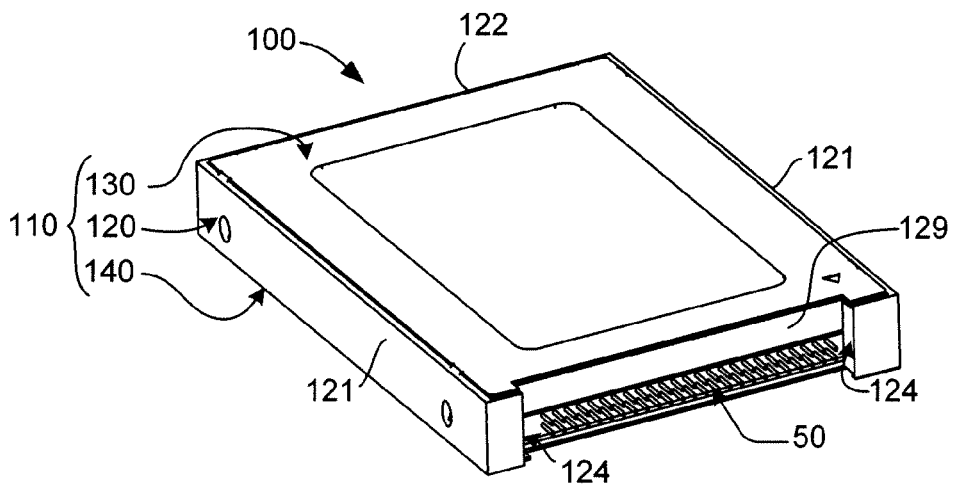
FIG. 2 is a perspective view showing the fully assembled flash hard drive produced using the components of FIG. 1.

FIGS. 1 and 2 are exploded perspective and assembled perspective views, respectively, showing a flash hard drive 100 according to an embodiment of the present invention. Flash hard drive 100 generally includes a PCBA 50 mounted inside of a housing 110 that is generally formed by a plastic frame 120, a top panel 130 and a bottom panel 140. Additional features and structures of flash hard drive 100 are described below.

PCBA 50 generally includes a PCB 51 and a connector 55. PCB 51 is sized and constructed according to a predefined form factor, and includes one or more IC devices 60 (e.g., flash memory ICs and one or more controller ICs) and other optional electronic components mounted thereon. Each IC 60 has a substantially planar upper surface 62 that is spaced from and parallel to the surfaces of PCB 51. Connector 55, which also conforms to the selected form factor, is mounted onto a front edge 53 of PCB 51, and includes pins that communicate with ICs 60 via corresponding traces (not shown) formed on PCB 51 according to well-known practices. PCB 51 also includes a back edge 52 that is inserted into frame 120 in the manner described below. Several optional alignment notches 56 are defined along one or more edges of PCB 51.

Plastic frame 120, top panel 130 and bottom panel 140 collectively form housing 110, which is cooperatively assembled with PCBA 50 to protect ICs 60 and other components mounted on PCB 51. Plastic frame 120 supports PCB 51 in the manner described below. Top panel 130 and bottom panel 140 are stamped or otherwise formed from a suitably rigid material (e.g., sheet metal), and are respectively secured to the upper and lower edges of frame 120. Top panel 130 includes a substantially flat (planar) cover plate 131 having a back edge 132 and a front edge 133. The side edges 134 of wall 131 may be bent downward (i.e., substantially perpendicular to the plane defined by cover plate 131), and back edge 132 may also be bent downward to form an end wall (not shown). Extending downward from side edges 134 and end edge 132 are connection fingers 136 that secure top panel 130 to plastic frame 120 in the manner described below. Cover plate 131 includes a planar peripheral region 131-P surrounding a planar indented section 131-IN. In one embodiment, planar indented section 131-IN has a size that is substantially equal to a "footprint" collectively defined by IC devices 60. Similar to top panel 130, bottom panel 140 includes a substantially flat (planar) cover plate 141 having back edge 142 and a front edge 143, with side edges 144 of cover plate 141 including connection fingers 146 extending upward for connection to plastic frame 120. Cover plate 141 includes a planar peripheral region 141-P surrounding a planar indented section 141-IN.

Plastic frame 120 generally includes parallel side rails 121A and 121B (collectively referred to as side rails 121), a "closed" back end rail 122, and an "open" front end 124. End rail 122 extends between and rigidly connects back edges of side rails 121, and forms a closed end of frame 120. Open front end 124 is defined at front ends of side rails 121, and serves to expose connector 55 when PCBA 50 is mounted inside plastic frame 120. Plastic frame 120 provides a longitudinal shelf (platform) 125 for supporting PCB 51 along side edges 54 and back edge 52 in the manner described below. Several alignment protrusions 126 are located along side walls 121 that mate with alignment notches 56 formed in PCB 51 during the assembly process, as described below. Formed on an upper surface of side rails 121 and end rail 122 is an elongated groove or step 127 for receiving side edges 134 and back edge 132 of top panel 130 in the manner described in additional detail below. A similar elongated groove/step (not shown) is formed on a lower surface of side rails 121 and end rail 122 for receiving side edges 144 and back edge 142 of bottom panel 140. One or more holes (shown in FIG. 3, discussed below) are formed in groove 127 for receiving connection fingers 136 and 146 in the manner described below. An optional face plate 129 extends between side rails 121 adjacent to open end 124, and is positioned above the plane defined by longitudinal shelf 125 such that, when PCBA 50 is inserted into plastic frame 120, connector 55 is exposed below face plate 129, as indicated in FIG. 2.

Referring again to FIG. 1, according to an aspect of the invention, an upper isolation (contact) layer 150 and an optional lower isolation (contact) layer 160 are respectively disposed between upper surfaces 62 of IC devices 60 and an inside (underside) surface of upper metal panel 130 and lower metal panel 140. In one embodiment, contact layers 150 and 160 are adhesive layers that serve to secure the inside surfaces of cover plates 130/140 to PCBA 50 (e.g., to upper surfaces 62 of IC devices 60 or to other portions of PCB 51 or to mounting structures, such as a bar 65, that is secured to PCB 51). By both securing the peripheral edges of cover plates 131 and 141 to plastic frame 120 (i.e., using connection fingers 136/146) and securing a central region of cover plates 131 and 141 to PCBA 50, housing 110 provides a highly reliable rigid protection structure that is substantially less expensive to produce than conventional metal-frame housings connected by fasteners. The inventors note that although the integrity of housing 110 is maximized by using both connection fingers 136/146 and electric isolation layers 150/160, one or both of these connecting elements may be omitted is certain specific embodiments. For example, in embodiments where connection fingers 136/146 provide a highly reliable and rigid connection between metal frames 130/140 and plastic frame 120, isolation layers 150/160 may comprise an electrically insulating, shock-absorbing material that allows cover plates 131/141 to press against PCBA 50 but prevents damage to IC devices 60. Note also that isolation 150/160 may be formed using a thermally conductive material, thereby facilitating cooling of IC devices 60 by way of cover plates 130 and 140 (i.e., cover plates 130/140 act as heat sinks in this arrangement).

FIG. 2 shows flash hard drive 100 after PCBA 50 is received in plastic frame 120, and panels 130 and 140 are mounted onto upper and lower surfaces of plastic frame 120. Note that when PCBA 50 is fully inserted into frame 120 and panels 130 and 140 are mounted thereon, connector 55 is exposed through open end 124, and the peripheral edges of panels 130 and 140 (e.g., side edges 134/144 and back edges 132/142) are mated to plastic frame 120 such that planar peripheral regions 131-P and 141-P are substantially flush with the upper and lower edges of side rails 121 and closed back end rail 122. In addition to providing a more aesthetically attractive package, this flush arrangement prevents exposure of side edges 134/144 and back edges 132/142 to damage by snagging or otherwise being pried from plastic frame 120, thus allowing cover plates 130/140 to be formed using a thinner metal plate than that required in conventional hard disk drives, thereby further facilitating lighter weight without sacrificing durability and protection.

Figure 3:
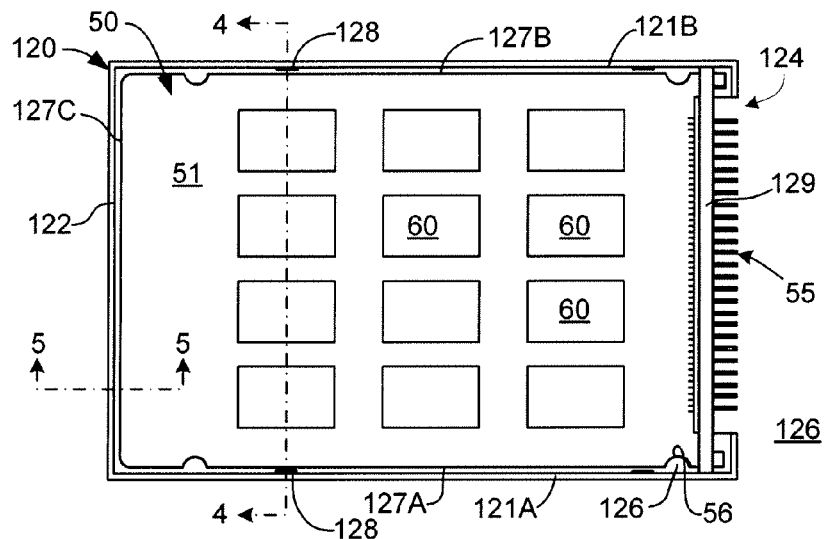
FIG. 3 is a top plan view showing a frame utilized in the flash hard drive shown in FIG. 1.
Figure 4A:
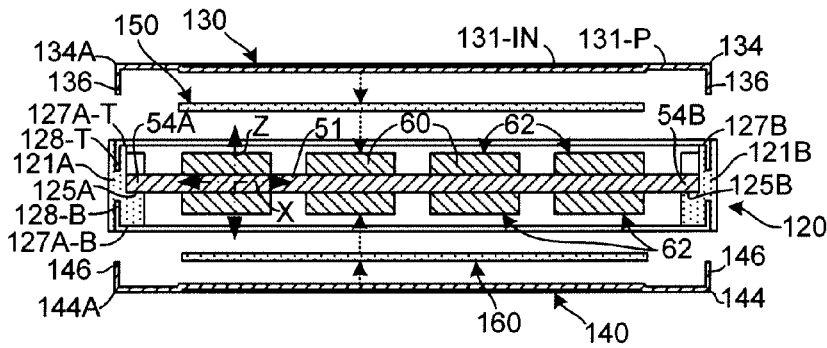
FIGS. 4(A) and 4(B) are partially exploded and fully assembled cross-sectional end views taken along section line 4-4 of FIG. 3.
Figure 5:
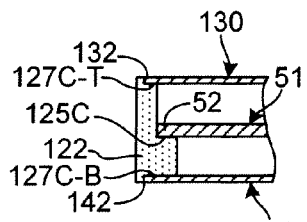
FIG. 5 is a cross-sectional side view taken along section line 5-5 of FIG. 3.
Figure 4B:
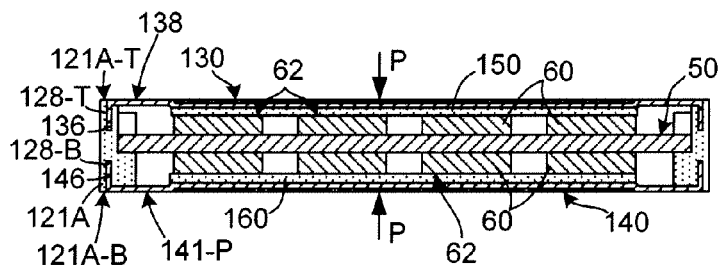

FIG. 3 is a top plan view showing frame 120 and PCBA 50 in additional detail, and FIGS. 4(A) and 4(B) and 5 are cross sectional side views taken along section lines 4-4 and 5-5, respectively, which are shown in FIG. 3.

As discussed above and shown again in FIG. 3, frame 120 includes parallel side rails 121A and 121B that are connected by back end rail 122, and includes a PCB support shelf 125 extending around side rails 121A and 121B and back end rail 122. FIGS. 4(A) and 4(B) show an exemplary cross-section of side rails 121A and 121B, and depicts top panel 130 and bottom panel 140 respectively positioned before and after mounting onto plastic frame 120. Similarly, FIG. 5 shows an exemplary cross-section of end rail 122 with top panel 130 and bottom panel 140 mounted thereon.

As indicated in FIGS. 4(A), 4(B) and 5, support shelf 125 is defined by side rails 121A and 121B and end rail 122, and is located in an X-Y plane extending across a central region of plastic frame 120 between side rails 121A and 121B. In particular, as indicated on the left side of FIG. 4(A), side rail 121A defines a shelf portion 125A that receives side edge 54A of PCB 51 when PCBA 50 is inserted into plastic frame 120. Referring to the right side of FIG. 4(A), side rail 121B defines a shelf portion 125B that supports a second side edge 54B of PCB 51 when PCBA 50 is inserted into plastic frame 120. Similarly, FIG. 5 shows that end rail 122 defines an end shelf portion 125C that supports back edge 52 of the PCB 51. By providing precisely cut shelf portions 125A, 125B, and 125C, PCB 51 is securely supported within plastic frame 120 during assembly to minimize the possibility of damage or circuit short due to contact with top panel 130 or bottom panel 140.

In addition, FIG. 4(A) shows upper groove portion 127A-T and bottom groove portion 127A-B for receiving side edge 134A of top panel 130 and side edge 144A of bottom panel 140. Defined into groove portions 127A-T and 127A-B are engagement holes 128-T and 128-B, respectively, for receiving connection fingers 136/146, respectively. Engagement holes 128-T and 128-B, can be either through-holes penetrating the side rails 121A or 121B, or pocket-like cavities with rectangular cross-sections and depths that are shorter than the height of the side rails 121A or 121B. For illustration purpose, FIG. 4(A) shows the pocket-like engagement holes 128-T and 128-B. As shown in FIG. 5, a similar groove portions 127C-T and 127C-B are formed along back rail 122 for supporting back edges 132/142 of panels 130/140, respectively.

Figure 6:
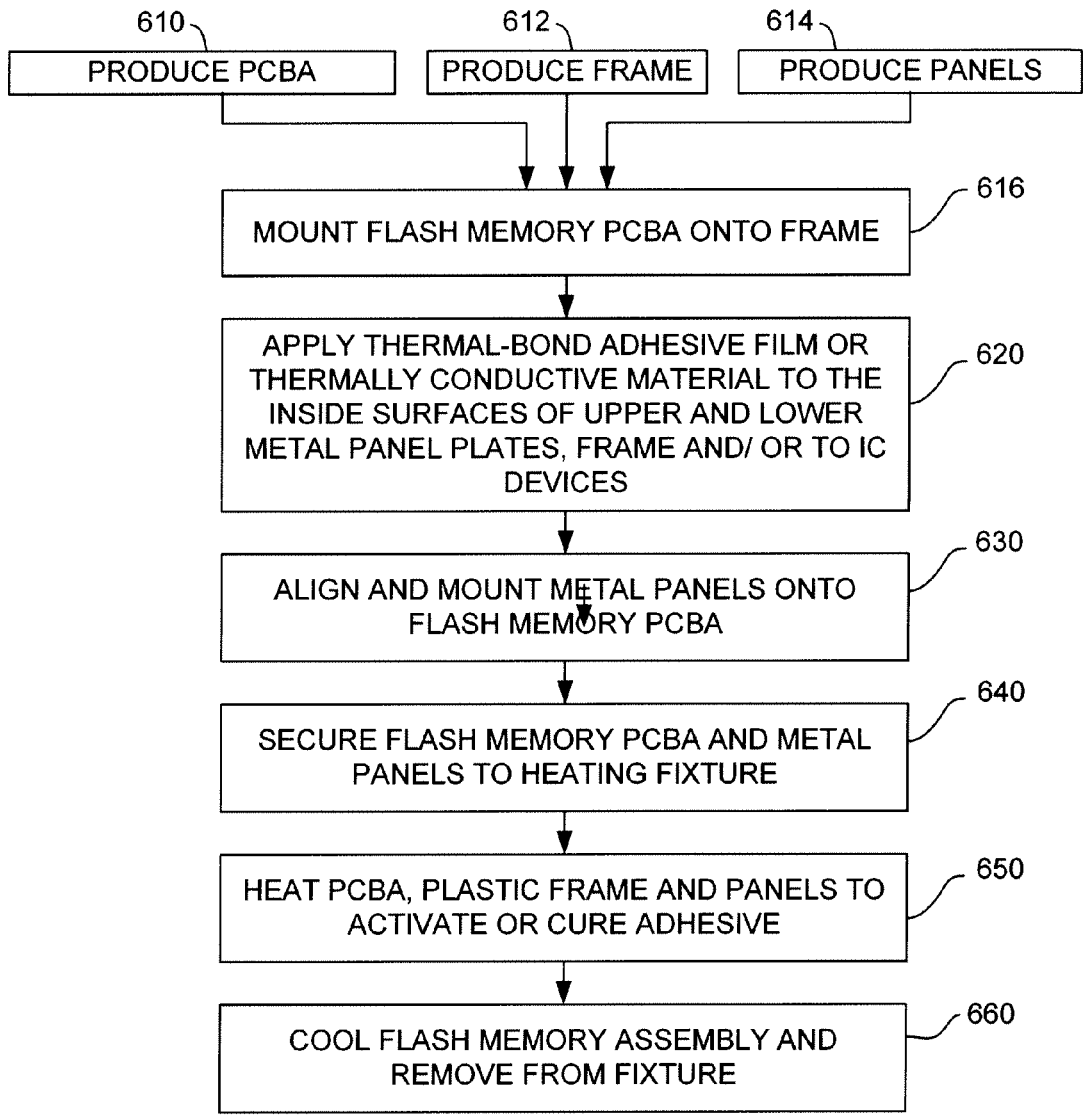
FIG. 6 is a flow diagram showing a method for producing a flash hard drive or a flash memory device according to another embodiment of the present invention.

FIG. 6 is a flow diagram showing a simplified method for producing a flash hard drive or other flash memory device according to another embodiment of the present invention. Referring to the upper portion of FIG. 6, the process begins by assembling and pre-testing a PCBA (block 610), and producing or otherwise procuring a frame consistent with the frame structures described herein (block 612) and top and bottom panels consistent with the panel structures described herein (block 614). Note that, as set forth below, blocks 612 and 614 may be combined (i.e., where the frame includes one or both metal panels integrally formed thereon). The method then includes inserting the PCBA into the frame (block 616) in the manner described above. When fully inserted, connector 55 is exposed through open end 124 (as indicated in FIG. 2). A suitable self-locking mechanism (e.g., snap-coupling between frame 120 and PCB 51 and/or connector 55) may be used to secure frame 120 to PCBA 50.

Referring to the center of FIG. 6, after PCBA 50 is inserted and secured to plastic frame 120, a thermal bond adhesive film or thermally conductive material layers 150/160 are applied either upper surfaces 62 of IC devices 60, frame 120, and/or to the inside surfaces of panels 130/140 (block 620). Panels 130/140 are then aligned and mounted onto plastic frame 120 and PCBA 50 in the manner described above (block 630). The thus-assembled structure is then secured in a fixture (block 640), such as fixture 900 described below with reference to FIG. 9, whereby the panels are pressed against the IC devices (e.g., as shown by arrows P in FIG. 4(B), the pressing force sandwiches adhesive/conductive layers 150/160 between panels 130/140, respectively, and external surfaces 62 of IC devices 60). Note that the panels 130/140 are thus maintained such that their planar peripheral regions are flush with corresponding edges of the side rails. Returning to FIG. 6, the fixture is then inserted into an oven to subject to a heating process to activate/cure the adhesive/conductive layers 150/160 (block 650). After activating/curing the adhesive, the fixture is removed from the oven and allowed to cool, and then the flash hard drive assembly is removed from the fixture (block 660).

Although the present invention is described above with reference to flash hard drives, the novel aspects of the present invention may also be utilized in the production of flash memory devices, as set forth in the following specific embodiments. In particular, the present invention provides an efficient and cost effective method for producing flash memory devices for certain military or industrial applications.

Figure 7:
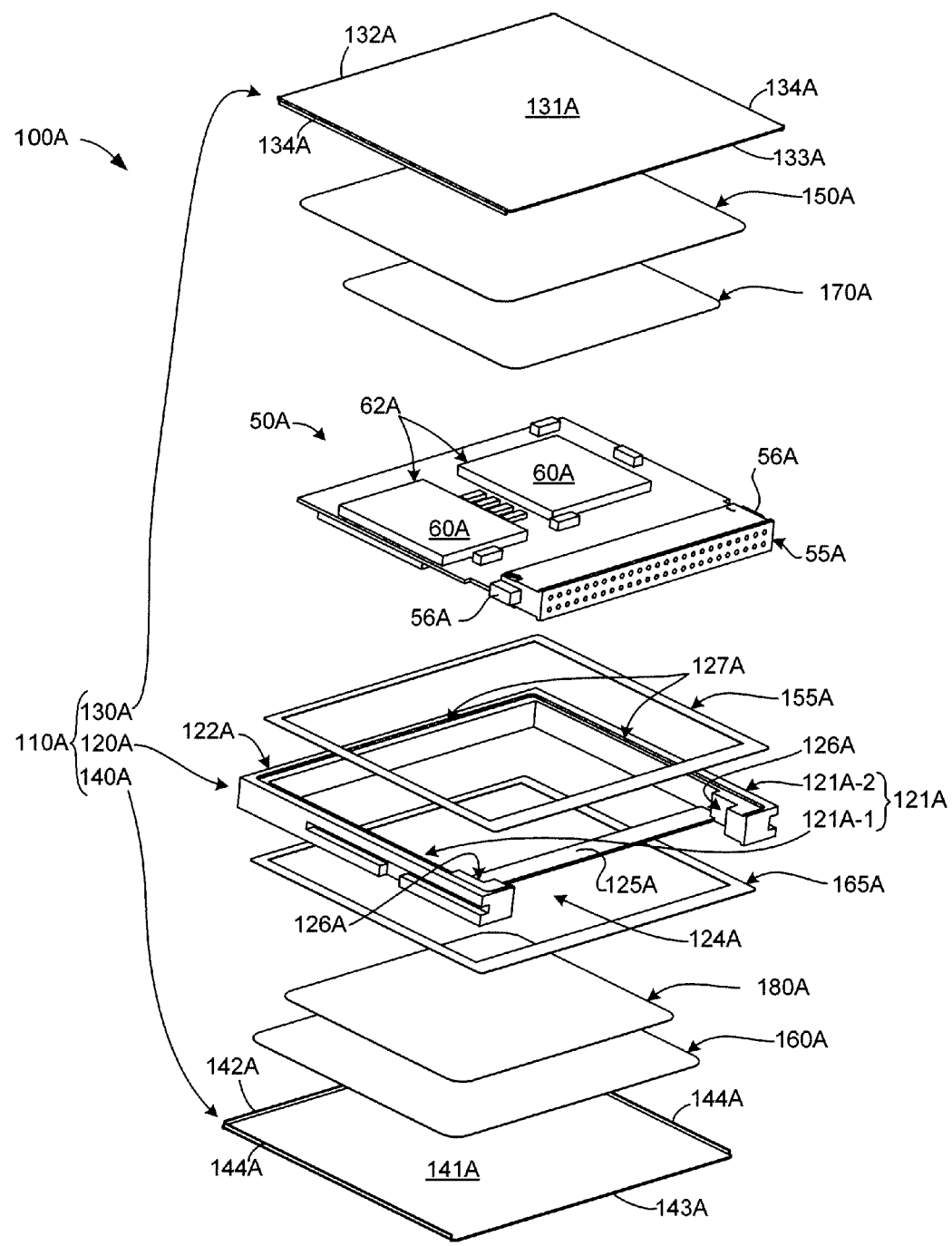
FIG. 7 is an exploded perspective view showing a flash memory device according to an embodiment of the present invention.

FIG. 7 is an exploded perspective and assembled perspective views, respectively, showing a flash memory device 100A according to an embodiment of the present invention. Flash memory device 100A generally includes a PCBA 50A mounted inside of a housing 110A that is generally formed by a plastic frame 120A, a top panel 130A and a bottom panel 140A.

Figure 8:
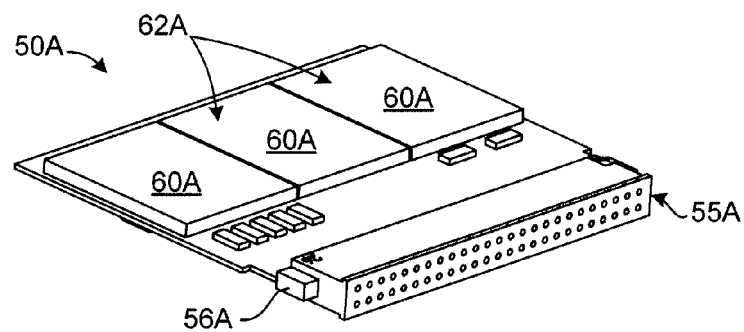
FIG. 8 is a bottom perspective view showing a PCBA of the flash memory device of FIG. 7.

In addition to being shown in FIG. 7, PCBA 50A is shown in bottom perspective view in FIG. 8. PCBA 50A generally includes a lead-free PCB 51A and a connector 55A that form a predetermined Non-Volatile Memory (NVM) device. PCBA 50A also includes one or more IC devices 60A and other optional electronic components mounted on PCB 51A that includes conductive traces, with each IC 60A having a substantially planar upper surface 62A. Connector 55A is aligned and soldered to metal contact pads formed on a front edge of PCB 51A. Connector 55A includes rectangular blocks 56A that extend from both ends for securing PCBA 50A to frame 120A as described below.

Figure 10A:
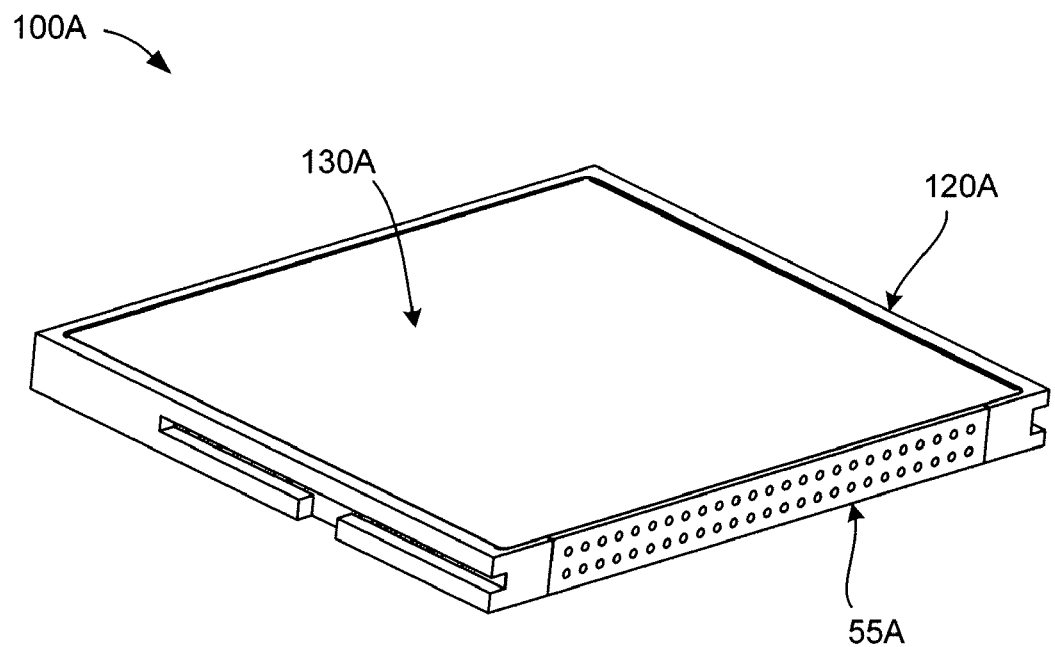
FIGS. 10(A) and 10(B) are top and bottom perspective views showing the flash memory device of FIG. 7 in an assembled state.
Figure 10B:
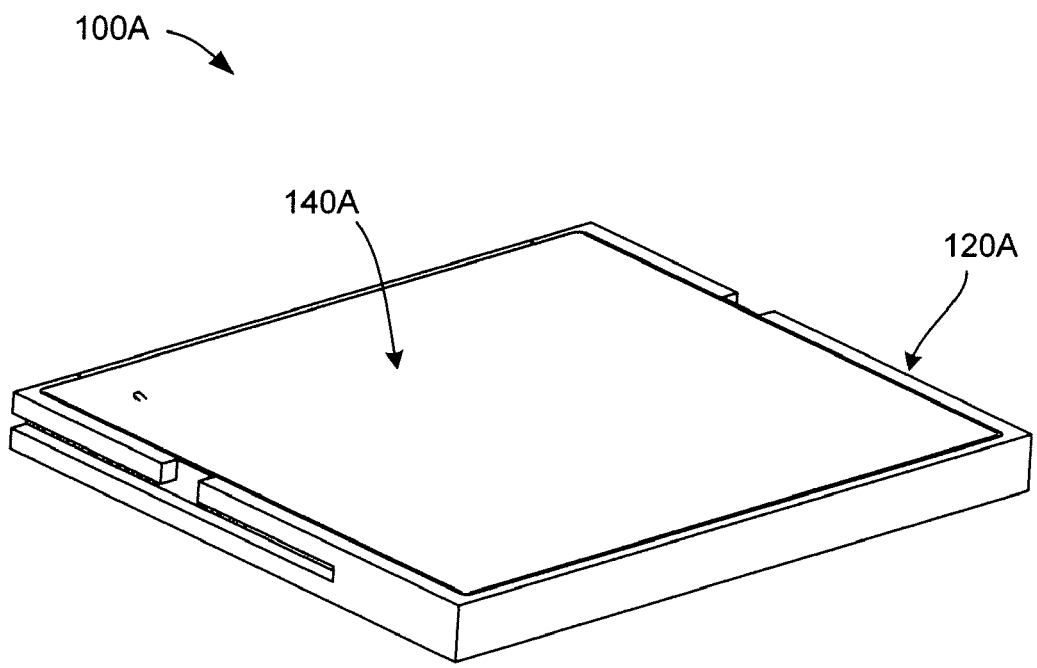

Plastic or metal frame 120A generally includes parallel side rails 121A-1 and 121A-2 (collectively referred to as side rails 121A), a "closed" back end rail 122A, and an "open" front end 124A. Plastic frame 120A also includes a longitudinal shelf (platform) 125A extending between side rails 121A for supporting PCBA 50A. PCBA 50A is mounted into and aligned with the edge of frame 120A. Frame 120A also includes rectangular slots 126A formed on the front edge of frame 120A for receiving rectangular blocks 56A of connector 55A such that blocks 56A are inserted into and fit snugly inside slots 126A to keep PCBA 50A in a predetermined position inside frame 120A. Finally, shallow recesses 127A are defined along side rails 121A and back end rail 122A on both (upper and lower) sides of frame 120A for receiving metal panels 130A and 140A such that upper surfaces of the metal panels are flush with the outer peripheral portions of frame 120A, as shown in FIGS. 10(A) and 10(B).

Metal panels 130A and 140A are stamped or otherwise formed from a selected sheet metal, such as aluminum, stainless steel or metal alloy. Top panel 130A includes a substantially flat (planar) cover plate 131A having a back edge 132A and a front edge 133A. The side edges 134A of wall 131A are bent downward (i.e., substantially perpendicular to the plane defined by cover plate 131A), and back edge 132A is also be bent downward to form an end wall (not shown). Similar to top panel 130A, bottom panel 140A includes a substantially flat (planar) cover plate 141A having back edge 142A and a front edge 143A, and side edges 144A that are bent to extend upward. Metal panels 130A and 140A are sized to fit within the shallow recesses (e.g., shallow recess 126A) formed on both sides of frame 120A, thereby providing reliable structures for securing metal panels 130A and 140A to frame 120A, thereby resisting damage caused, for example, when flash memory device 100A is dropped or otherwise subjected to mechanical shock.

In accordance with the invention, flash memory device 100A is assembled using only thermal bond adhesive to secure metal panels 130A and 140A to at least one of PCBA 50A and frame 120A (i.e., no mechanical fastener is utilized to secure panels 130A and 140A to frame 120A or PCBA 50A), whereby metal panels 130A and 140A and frame 120A form housing 110A around PCBA 50A such that only connector 55A is exposed outside housing 110A (i.e., PCB 51A and ICs 60A are entirely enclosed within housing 110A, but connector 55A is exposed through front end opening 124A defined by frame 120A). In one embodiment, thermal bond adhesive layers 150A and 160A are disposed between upper surfaces 62A of ICs 60A and the inner surfaces of the upper and lower metal panels 130A and 140A, respectively, whereby metal panels 130A and 140A are secured to upper surfaces 62A of ICs 60A by first and second thermal bond layers 150A and 160A, respectively. In another embodiment, peripheral thermal bond adhesive layers 155A and 165A are disposed between side rails 121A and back end rail 122A and corresponding peripheral edges upper and lower metal panels 130A and 140A, respectively, whereby metal panels 130A and 140A are secured to frame 120A by first and second thermal bond layers 155A and 165A, respectively. In yet another embodiment, all of thermal bond adhesive layers 150A, 160A, 155A and 165A are utilized to secure metal panels 130A and 140A to both PCBA 50A and to frame 120A. In one embodiment, films 150A, 155A, 160A and 165A are thermal bonding films (e.g., product numbers TBF615, TBF668) produced by 3M of St. Paul Minn. An alternative process to the above thermal-bond adhesive film is to use high viscosity adhesives or thermal compounds to implement films 150A and 160A.

In accordance with certain embodiments of the present invention, one or more optional layers 170A and 180A are attached to one of the inner surfaces of the upper and lower metal panels 130A and 140A or disposed over PCBA 50A. In one embodiment (e.g., when only peripheral adhesive layers 155A and 165A are used), layers 170A and 180A contact both inner surfaces of the upper and lower metal panels 130A and 140A and upper surfaces 62A of ICs 60A. In another embodiment, (e.g., when adhesive layers 150A and 160A are used), layers 170A and 180A contact only one of the inner surfaces of the upper and lower metal panels 130A and 140A and PCBA 50A. In one embodiment, layers 170A and 180A comprise electrical insulation material disposed between to metal panels 130A and 140A and PCBA 50A to protect PCBA 50A from shorting with metal panels 130A and 140A. In another embodiment, layers 170A and 180A comprise a thermally conductive material, such as ThermaCool (e.g., product numbers TC100U) of Worcester, Mass., to facilitate cooling of PCBA 50A by way of metal panels 130A and 140A. In yet another embodiment, layers 170A and 180A comprise a conformal coating that is disposed over ICs 60 to prevent oxidation of IC leads or soldering area, covering or protecting for extreme temperature exposure either cold or hot, and waterproofing for certain military or industrial applications. The procedure of applying the conforming coating to the flash memory device includes: a) putting a masking cap or tape on specific area such as connectors and switches; b) spraying or brushing the conforming coating material (e.g., HumiSeal® 1B73); and c) inspecting the coated area with ultraviolet (UV) lights for imperfection (e.g., bubbles, missed coating area).

In accordance with one embodiment, flash memory device 100A is assembled by mounting PCBA 50A into frame 120A, mounting metal panels 130A and 140A onto opposite sides of frame 120A to enclose ICs 60A by way of thermal bond adhesive. In accordance with a specific embodiment of the present invention, the assembly process involves disposing thermal-bond adhesive films 150A and 160A between the inner peripheral surfaces of the metal panels 130A and 140A and the upper surfaces of IC devices 60A, whereby metal panels 130A and 140A are attached to frame 120A and to PCBA 50A solely by contact layers 150A and 160A. In this case the adhesive can be applied to the inside surfaces of metal panels 130A and 140A by manual or automatic using dispensing machine, and then metal panels 130A and 140A are immediately pressed against PCBA 50A. A grounding metal clip or tab (not shown) is embedded into connector 55A and contacts at least one of metal panels 130A and 140A to electrically bridge metal panels 130A and 140A to prevent ESD damage to IC devices 60A when a user touches the metal panels 130A and 150A. In another specific embodiment, adhesive films 150A and 160A are compressed between metal panels 130A and 140A and flash memory ICs 60A, and are held in the compressed state using a press fixture, such as that shown and described below with reference to FIG. 9. The fixture/assembly is then passed through an oven maintained at a specified temperature (i.e., at or lower than the maximum safe operating temperature for IC memory devices 60A) to activate or cure adhesive films 150A and 160A. The assembly is then cured at an elevated temperature of 80° C. for about 15 minutes, thereby forming flash memory device 100A, shown in top and bottom perspective views in FIGS. 10(A) and 10(B), including metal panels 130A and 140A secured to frame 120A over the PCBA such that only connector 55A is exposed. For re-work to separate PCBA from the assembly parts, a heating machine is used to heat the assembly at a temperature of about 150° C. for several seconds to remove the adhesives.

Figure 9:
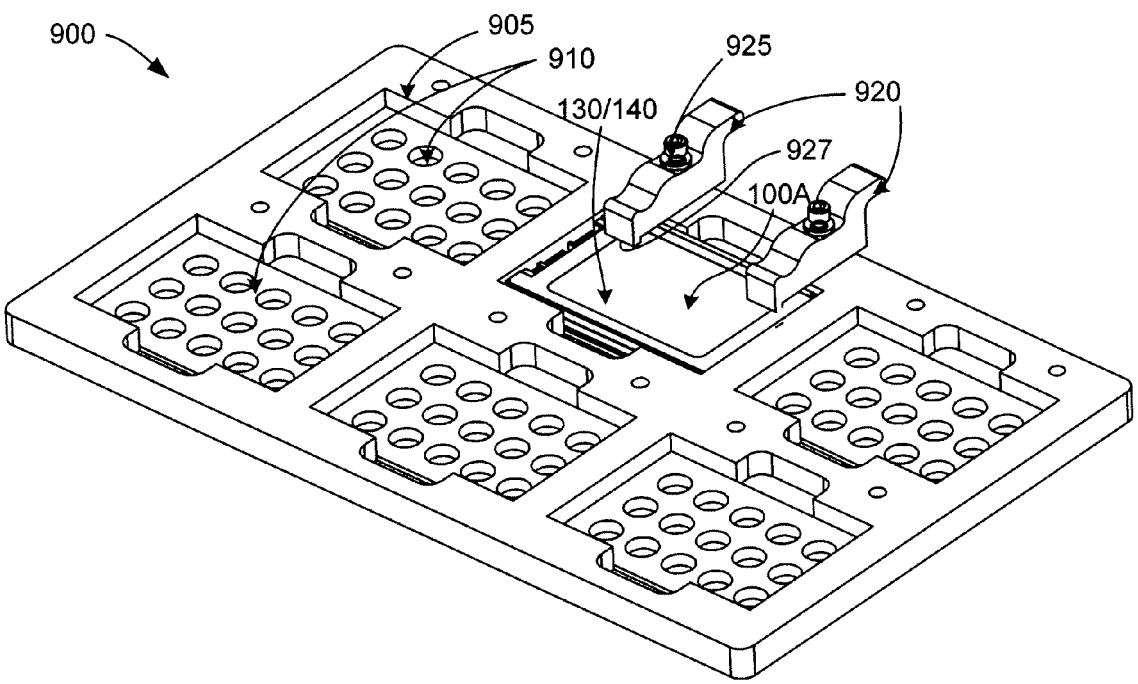
FIG. 9 is a perspective view showing a heat treatment fixture utilized in the production of the flash memory device of FIG. 7 according to another embodiment of the present invention.

FIG. 9 is a perspective view showing a heat-sink reflow fixture 900 utilized in the processes associated with blocks 640 to 660 of FIG. 6 according to another embodiment of the present invention. The flash memory devices assembled using fixture 900 may include any of the modules described in the embodiments set forth above and below. Fixture 900 includes a base 905 defining a plurality of recesses 910 for receiving flash memory devices (e.g., flash memory device 100A) in the depicted manner. Two spring clamps 920 are mounted onto base 905 and include adjustment screws 925 that, when turned, press contact points 927 against metal panel plates 130A or 140A of flash memory device 100A, thereby securing flash memory device 100A in a fixed manner for heat treatment. Although six recesses 910 are shown, the number of recesses may be increased or decreased to maximize the efficiency of the heat treatment process.

Figure 11:
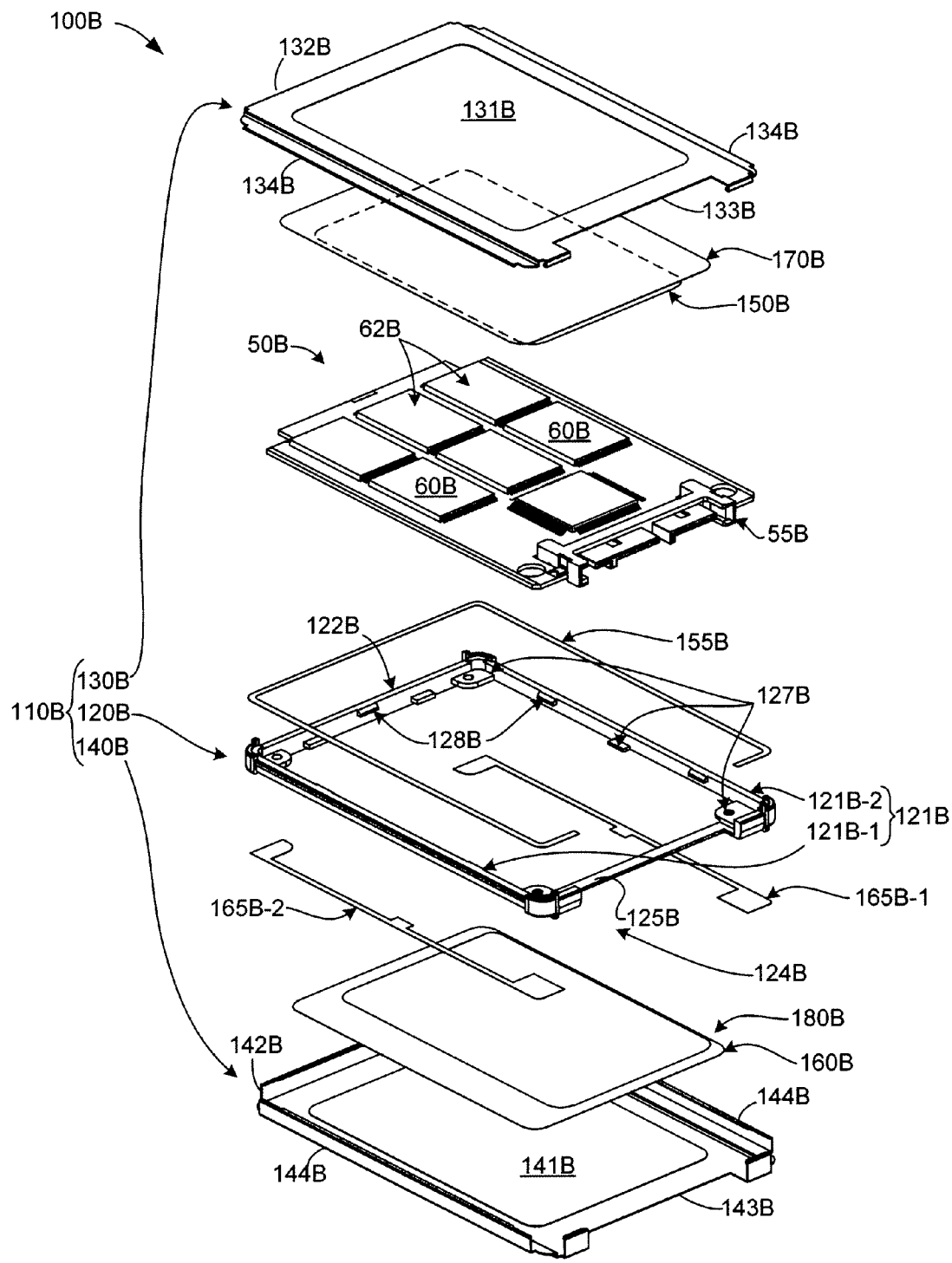
FIG. 11 is an exploded perspective view showing a flash memory device according to another embodiment of the present invention.
Figure 12A:
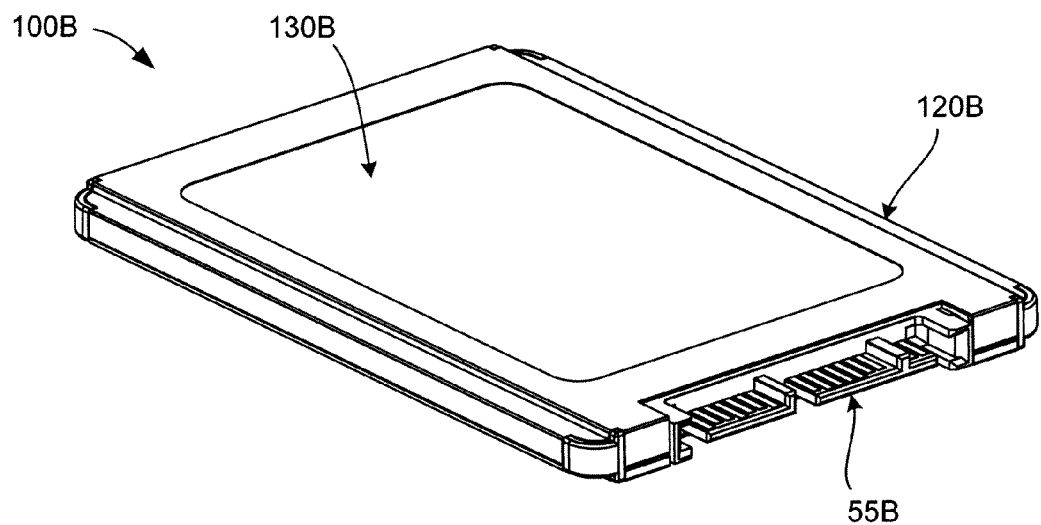
FIGS. 12(A) and 12(B) are top and bottom perspective views showing the flash memory device of FIG. 11 in an assembled state.
Figure 12B:
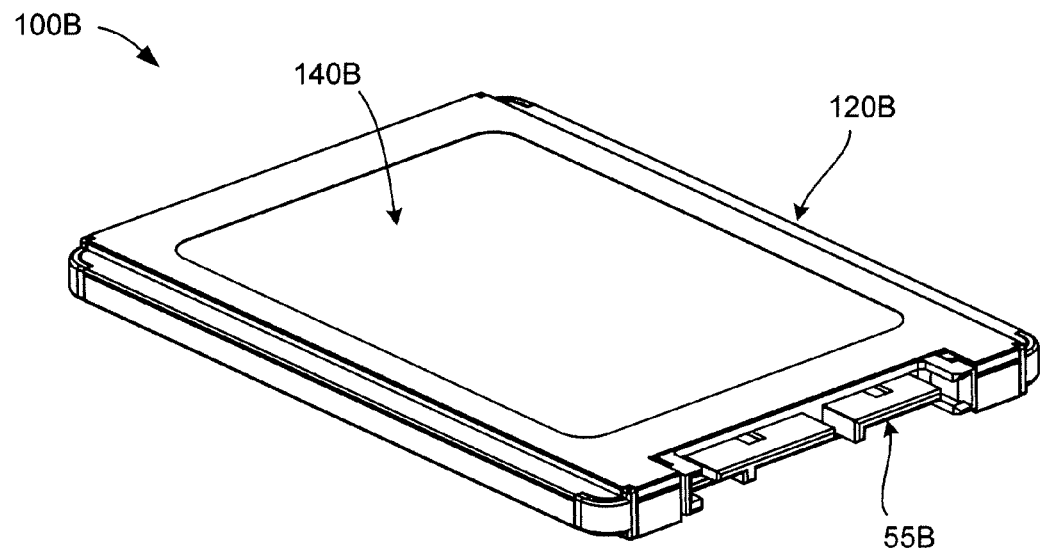

FIG. 11 is an exploded perspective view showing a SSD (Solid State Drive) SATA flash memory device 100B according to another embodiment of the present invention. Flash memory device 100B generally includes a PCBA 50B mounted inside of a housing 110B that is generally formed by a plastic frame 120B, a top panel 130B and a bottom panel 140B. PCBA 50B generally includes a lead-free PCB 51B and a SATA or micro SATA connector 55B soldered to a front edge of PCB 51B. PCBA 50B also includes one or more IC devices 60B having planar upper surface 62B. Frame 120B generally includes parallel side rails 121B-1 and 121B-2 (collectively referred to as side rails 121B), a "closed" back end rail 122B, and an "open" front end 124B. Plastic frame 120B also includes a longitudinal shelf (platform) 125B extending between side rails 121B for supporting PCBA 50B. PCBA 50B is mounted into and aligned with the edge of frame 120B. Metal panel 130B includes flat (planar) cover plate 131B having a back edge 132B and a front edge 133B. The side edges 134B of wall 131B are bent downward (i.e., substantially perpendicular to the plane defined by cover plate 131B), and back edge 132B is also be bent downward to form an end wall (not shown). Similar to top panel 130B, bottom panel 140B includes a substantially flat (planar) cover plate 141B having back edge 142B and a front edge 143B, and side edges 144B that are bent to extend upward. Metal panels 130B and 140B are mounted onto frame 120B, thereby providing reliable structures for securing metal panels 130B and 140B to frame 120B, thereby resisting damage caused, for example, when flash memory device 100B is dropped or otherwise subjected to mechanical shock. Flash memory device 100B is assembled using only thermal bond adhesive to secure metal panels 130B and 140B to at least one of PCBA 50B and frame 120B such that metal panels 130B and 140B and frame 120B form housing 110B around PCBA 50B such that only connector 55B is exposed outside housing 110B. In one embodiment, thermal bond adhesive layers 150B and 160B and optional layers 170B and 180B are disposed between upper surfaces 62B of ICs 60B and the inner surfaces of the upper and lower metal panels 130B and 140B, respectively. In another embodiment, peripheral thermal bond adhesive layers 155B and 165B are disposed between side rails 121B and corresponding peripheral edges upper and lower metal panels 130B and 140B. FIGS. 12(A) and 12(B) are top and bottom perspective views showing flash memory device 100B after assembly, wherein metal panels 130B, 140B and frame 120B form a housing in which only connector 55B is exposed.

Figure 13:
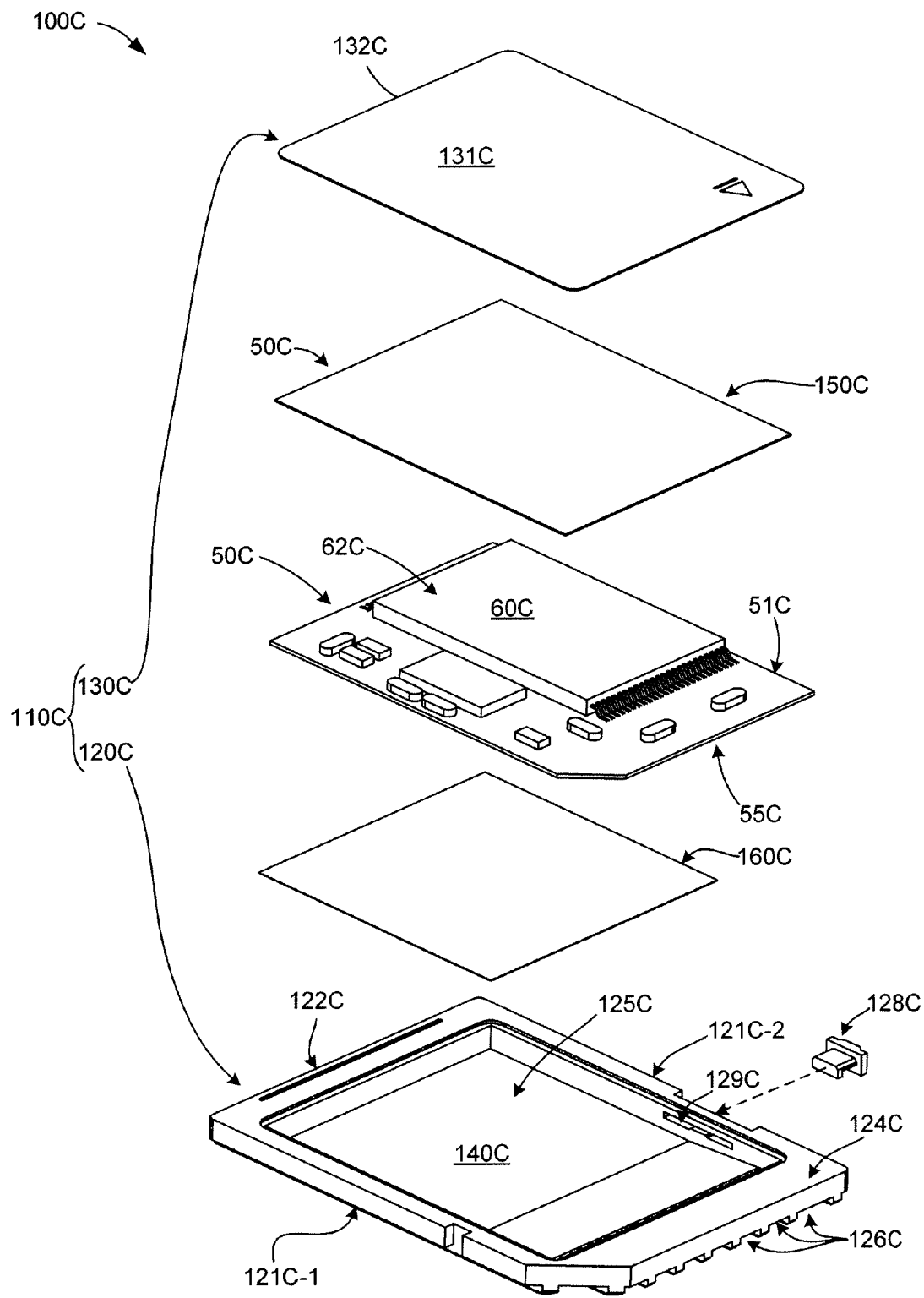
FIG. 13 is an exploded perspective view showing a flash memory device according to another embodiment of the present invention.
Figure 14:
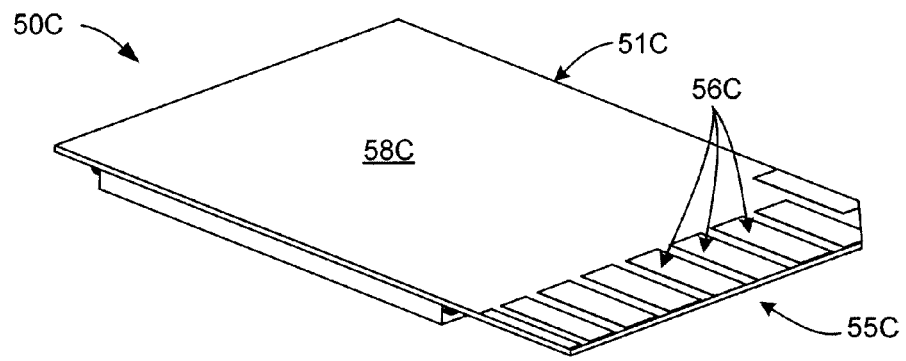
FIG. 14 is a bottom perspective view showing a PCBA of the flash memory device of FIG. 13.
Figure 15A:
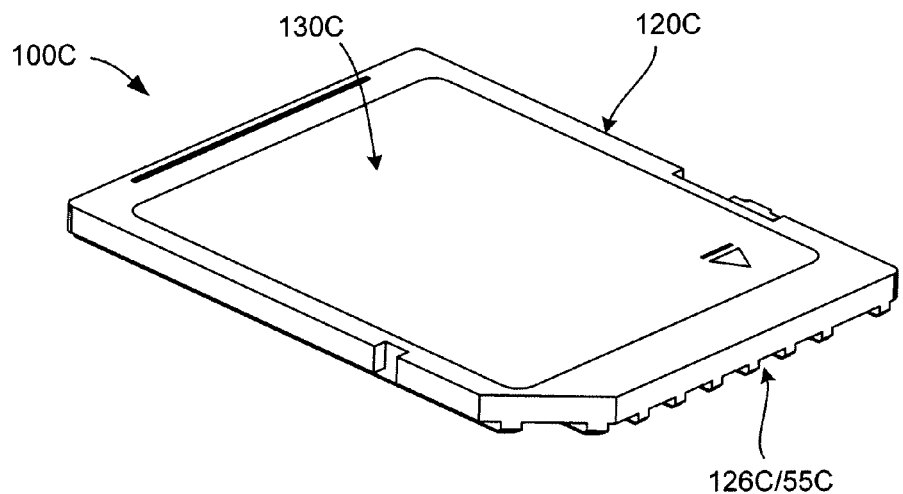
FIGS. 15(A) and 15(B) are top and bottom perspective views showing the flash memory device of FIG. 13 in an assembled state.
Figure 15B:
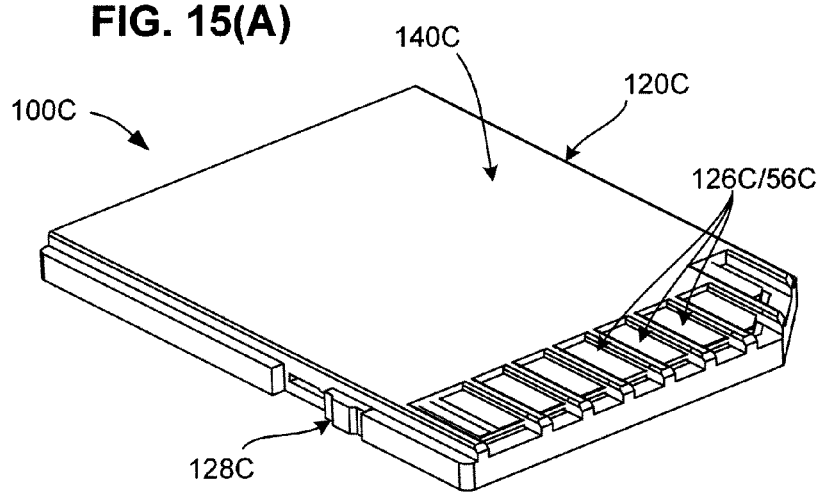

FIG. 13 is an exploded perspective view showing a Secure Digital (SD) flash memory device 100C according to another embodiment of the present invention. Flash memory device 100C generally includes a PCBA 50C mounted inside of a housing 110C that is formed by a frame 120C having a (first) lower plastic panel 140C integrally formed thereon, and a (second) top plastic panel 130C that is mounted onto frame 120C after PCBA 50C is mounted therein. PCBA 50C includes a lead-free PCB 51C, one or more IC devices 60C having planar upper surface 62C mounted on one side of PCB 51C, and, as shown in FIG. 14, a connector structure 55C including multiple contact pads 56C that are arranged in a pattern defined by the SD standard and disposed on a lower surface 58C of PCB 51C. Frame 120C includes parallel side rails 121C-1 and 121C-2, a "closed" back end rail 122C, and a front end rail 124C that surround an upper opening 125C, and front end 124C also defines multiple front openings 126C. A write protect switch 128C is slidably engaged in a slot 129C defined in side rail 121C-2. Plastic panel 130C includes flat (planar) cover plate 131C having a peripheral edge 132C. Flash memory device 100C is assembled by applying thermal bond adhesive layer 150C to upper panel 130C or surfaces 62C of the upward facing ICs 60C, applying thermal bond adhesive layer 160C to lower panel 140C or lower surfaces 58C of PCBA 50C, mounting PCBA 50C into frame 120C through opening 125C such that contact pads 56C are aligned with openings 126C, whereby each contact pad 56C is exposed through a corresponding opening 126C, and then mounting plastic panel 130C over the upper opening of frame 120C. Thermal bond adhesive layers 150C and 160C are then heat activated using the method described above, thereby securing plastic panel 130C and frame 120C to PCBA 50C. As shown in FIGS. 15(A) and 15(B), the assembled SD flash memory device 100C is characterized in that plastic panel 130C and frame 120C form a housing around PCBA 50C such that only contact pads 56C of connector 55C are exposed through openings 126C outside the housing. Once the assembly is finished, write protect switch 128C is installed.

Figure 16:
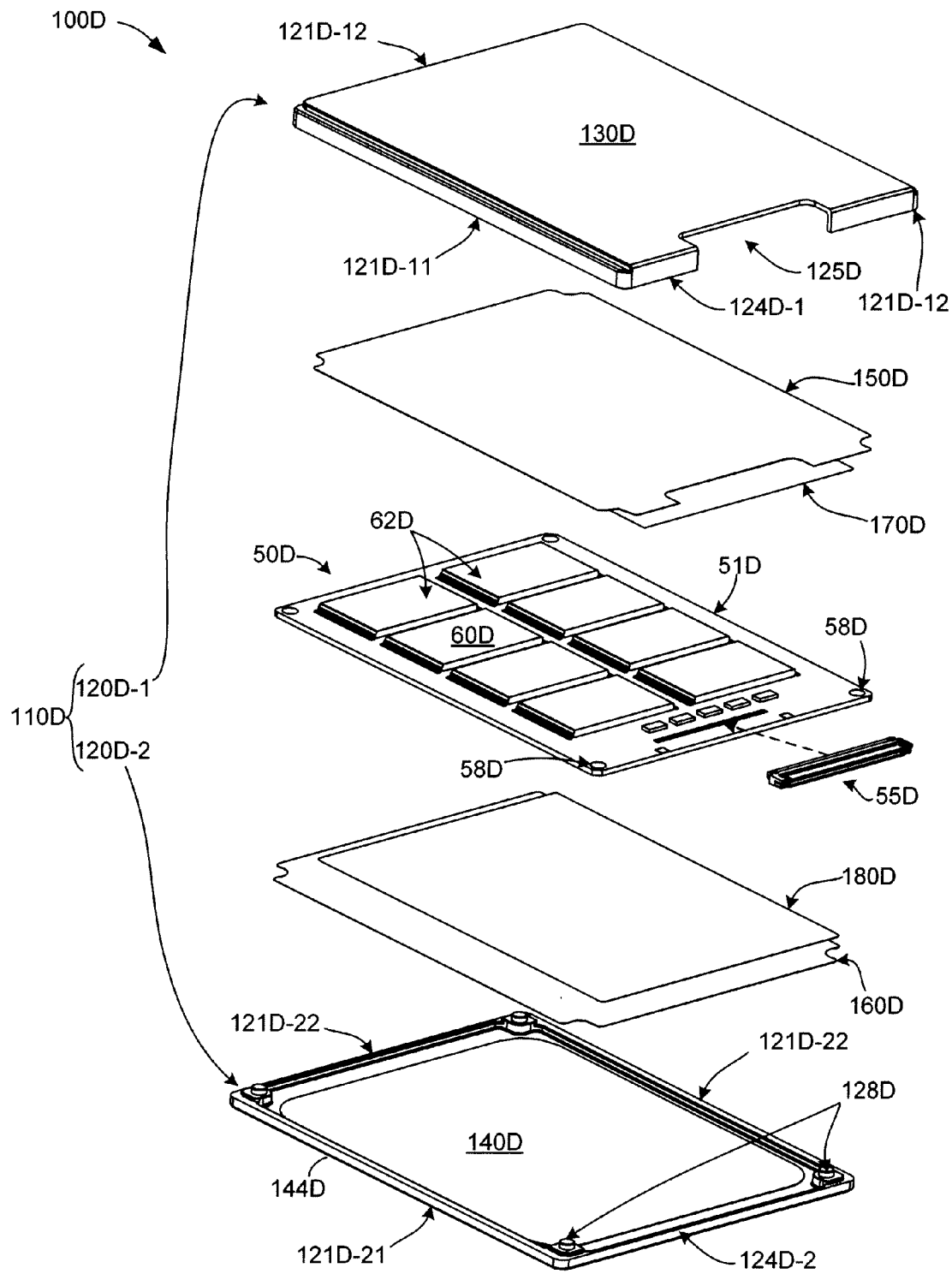
FIG. 16 is an exploded perspective view showing a flash memory device according to another embodiment of the present invention.
Figure 17A:
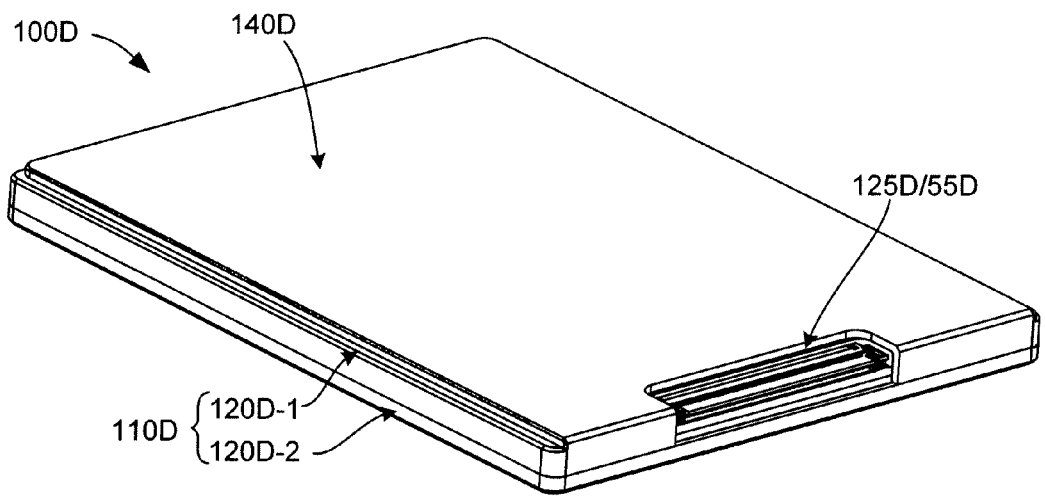
FIGS. 17(A) and 17(B) are top and bottom perspective views showing the flash memory device of FIG. 16 in an assembled state.
Figure 17B:
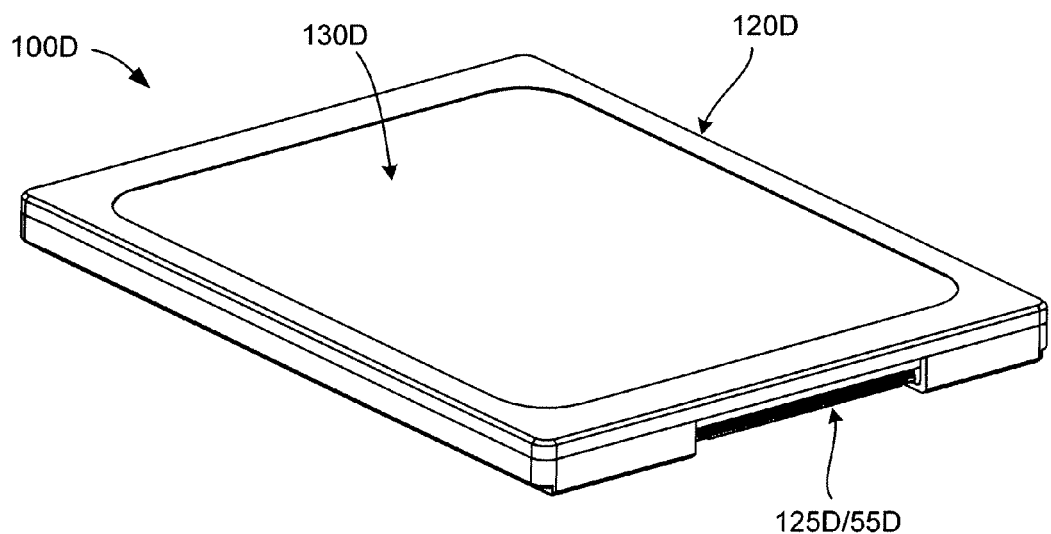

FIG. 16 is an exploded perspective view showing a flash memory device 100D, which is a ZIF type Solid State Drive (SSD according to another embodiment of the present invention. Flash memory device 100D includes a PCBA 50D mounted inside a housing 100D, which is formed by an upper frame portion 120D-1 having an upper metal panel 130D integrally formed thereon and a lower frame portion 120D-2 having a lower metal panel 140D integrally formed thereon. PCBA 50D includes a lead-free PCB 51D, one or more IC devices 60D having planar upper surface 62D mounted on both sides of PCB 51D, and a ZIF type connector structure 55D mounted onto a front edge of PCB 51D. Upper frame portion 120D-1 includes parallel side rail portions 121D-11 and 121D-12, a "closed" back end rail portion 122D-1, and a front end rail portion 124D-1 that define a front opening 125D, all extending downward from upper metal panel 130D. Lower frame portion 120D-2 includes parallel side rail portions 121D-21 and 121D-22, a "closed" back end rail portion 122D-2, and a front end rail portion 124D-2 that extends upward from lower metal panel 140D. Thermal bond adhesive layers 150D and 160D and optional layers 170D and 180D are disposed between upper surfaces 62D of ICs 60D and the inner surfaces of the upper and lower metal panels 130D and 140D, respectively. Flash memory device 100D is assembled by applying thermal bond adhesive layer 150D and optional layer 170D to upper metal panel 130D or surfaces 62D of the upward facing ICs 60D, applying thermal bond adhesive layer 160C and optional layer 180D to lower metal panel surface 140D or surfaces 62D of the downward facing ICs 60D of PCBA 50D. PCBA 50D is then mounted between frame portions 120D-1 and 120D-2 such that connector 55D is exposed through opening 125D, and such that posts 128D extend through openings 58D defined in PCB 51D and engage in holes (not shown) formed in upper frame portion 120D-1. Thermal bond adhesive layers 150D and 160D are then heat activated using the method described above, thereby securing metal panels 130D and 140D to PCBA 50D, thereby securing frame portions 120D-1 and 120D-2 to PCBA 50D. As shown in FIGS. 17(A) and 17(B), the assembled ZIF flash memory device 100D is characterized in that frame portions 120D-1 and 120D-2 (with integrally formed metal panel plates 130D and 140D, respectively) collectively form housing 110D that encloses PCBA 50D such that only connector 55D is exposed through opening 125D.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A flash memory device comprising:
   a printed circuit board assembly (PCBA) including a printed circuit board (PCB), a connector disposed on a front edge of the PCB, and a plurality of integrated circuit (IC) devices mounted onto one or more surfaces of the PCB;
   a frame including first and second parallel side rails and a back end rail extending between first ends of the first and second side rails, wherein the frame defines at least one front end opening;
   at least one panel disposed on the side rails and end rail of the frame such that the at least one panel extends over a first surface of the PCBA; and
   at least one thermal bonding film securing the at least one panel to at least one of the PCBA and the frame such that the at least one panel and the frame form a housing that surround the PCBA such that the connector is exposed through the at least one front end opening,
   wherein the at least one panel is attached to one of the frame and the PCBA solely by said at least one thermal bonding film.

2. The flash memory device according to claim 1, wherein the at least one panel is secured to upper surfaces of said plurality of IC devices by a first thermal bonding film.

3. The flash memory device according to claim 1, wherein the at least one panel is secured to the frame by a first peripheral thermal bonding film.

4. The flash memory device according to claim 1, wherein said first and second parallel side rails and back end rail of said frame define a shallow recess, and said at least one panel is received in said shallow recess such that an upper surface of the at least one panel is flush with the outer peripheral portions of frame.

5. The flash memory device according to claim 1, wherein the at least one panel includes a first panel disposed on a first side of the frame and attached to one of the frame and the PCBA by a first thermal bonding film, and a second panel disposed on a second side of the frame and attached to one of the frame and the PCBA by a second thermal bonding film.

6. The flash memory device according to claim 1, wherein the frame comprises a first panel that is integrally formed with the side rails, and a second panel that is attached to one of the frame and the PCBA solely by said at least one thermal bonding film.

7. The flash memory device according to claim 1, wherein the frame comprises a first frame portion, a first panel that is integrally formed with first side rail portions of the first frame portion, a second frame portion, and a second panel that is integrally formed with second side rail portions of the second frame portion, and
wherein the first panel is attached to the PCBA solely by a first thermal bonding film, and the second panel is attached to the PCBA solely by a second thermal bonding film.

8. The flash memory device according to claim 1, wherein the at least one panel comprises metal.

9. The flash memory device according to claim 1, wherein the PCBA complies with one of a Serial Advanced Technology Attachment (SATA), micro SATA, Secure Digital (SD), micro SD, Integrated Drive Electronics (IDE), PCI Express, Universal Serial Bus (USB), Memory Stick, and Zero Insertion Force (ZIF) specification.

10. A flash memory device comprising:
a printed circuit board assembly (PCBA) including a printed circuit board (PCB), a connector disposed on a front edge of the PCB, and a plurality of integrated circuit (IC) devices mounted onto one or more surfaces of the PCB;
a frame including first and second parallel side rails and a back end rail extending between first ends of the first and second side rails, wherein the frame defines at least one front end opening;
at least one panel disposed on the side rails and end rail of the frame such that the at least one panel extends over a first surface of the PCBA; and
at least one thermal bond adhesive layer securing the at least one panel to at least one of the PCBA and the frame such that the at least one panel and the frame form a housing that surround the PCBA such that the connector is exposed through the at least one front end opening,
wherein the at least one panel is attached to one of the frame and the PCBA solely by said at least one thermal bond adhesive layer, and
wherein the flash memory device further comprises one of an electrically insulating layer, a thermally conductive layer, and a conformal coating layer disposed between the plurality of IC devices and the at least one panel and in contact with said at least one thermal bond adhesive layer.

11. A method for manufacturing a flash memory device comprising:
forming a printed circuit board assembly (PCBA) including a plurality of integrated circuit (IC) devices, and a housing including a frame and at least one panel; mounting the PCBA inside of the frame;
applying a thermal bonding film to one of: (a) an upper surface of at least one of the plurality of IC devices, (b) the frame, and (c) an inside surface of said at least one panel;
mounting the PCBA inside the housing such that only a connector of the PCBA is exposed outside of the housing;
mounting the frame, the PCBA, and the at least one panel into a fixture such that the thermal bonding film is pressed between the panel and at least one of the PCBA and the frame;
heating the fixture to a first relatively high temperature such that an adhesive disposed on the thermal bonding film is activated; and
cooling the fixture to a second, relatively low temperature.

12. The method according to claim 11, wherein mounting the at least one panel comprises mounting first and second panels over opposing sides of the PCBA such that each panel is secured to corresponding IC devices of said plurality of IC devices that are disposed on said opposing sides of the PCBA.

13. The method according to claim 11, wherein mounting the at least one panel comprises mounting first and second panels over opposing sides of the frame such that each panel is secured to corresponding sides of the frame by first and second thermal bonding films.

14. The method according to claim 11, wherein mounting the frame, the PCBA, and the at least one panel into the fixture further comprises placing the at least one panel, the PCBA and the frame into a recess formed in the fixture, and manipulating a spring clamp such that the at least one panel is pressed against the upper surface of said at least one of the plurality of IC devices.

* * * * *